(12) United States Patent
Abrigo et al.

(10) Patent No.: US 7,604,761 B2
(45) Date of Patent: Oct. 20, 2009

(54) PROCESS AND PLANT FOR CONTINUOUS MANUFACTURE OF LATEX FOAM ARTICLES

(75) Inventors: Luciano Abrigo, Alessandria (IT); Renzo Villa, Cassano d'Adda (IT)

(73) Assignee: Sapsa Bedding SRL, Milan (MI) (IT)

( * ) Notice: Subject to any disclaimer, the term of this patent is extended or adjusted under 35 U.S.C. 154(b) by 60 days.

(21) Appl. No.: 11/469,770

(22) Filed: Sep. 1, 2006

(65) Prior Publication Data
US 2007/0264484 A1   Nov. 15, 2007

(30) Foreign Application Priority Data
May 11, 2006   (IT)   .......................... MI2006A0936

(51) Int. Cl.
*B29C 67/20*   (2006.01)
(52) U.S. Cl. .................... 264/46.2; 264/45.8; 264/46.4; 264/45.6; 264/51; 264/259; 264/279.1; 264/273; 264/313; 425/4; 425/34.2; 425/115; 425/346 R; 425/370; 442/30; 442/221; 442/315
(58) Field of Classification Search ................ 264/46.2, 264/45.8, 46.4, 51, 259, 279, 279.1, 273, 264/313, 45.6; 425/4, 34.2, 115, 364 R, 425/370; 442/30, 221, 315
See application file for complete search history.

(56) References Cited

U.S. PATENT DOCUMENTS

| 3,007,205 | A | | 11/1961 | House |
| 3,385,751 | A | * | 5/1968 | Willard et al. ................. 428/94 |
| 5,229,138 | A | | 7/1993 | Carotti |
| 5,458,944 | A | * | 10/1995 | Austin .......................... 428/95 |
| 6,086,802 | A | | 7/2000 | Levera et al. |
| 6,998,077 | B2 | | 2/2006 | Levera et al. |
| 7,326,040 | B2 | | 2/2008 | Levera et al. |
| 2003/0209827 | A1 | | 11/2003 | Levera et al. |
| 2006/0073229 | A1 | | 4/2006 | Levera et al. |

FOREIGN PATENT DOCUMENTS

| EP | 0358914 | 3/1988 |
| EP | 0380963 | 8/1990 |
| EP | 0 955 144 A1 | 11/1999 |
| EP | 1 205 132 A2 | 5/2002 |
| EP | 1361033 | 11/2003 |

* cited by examiner

*Primary Examiner*—Christina Johnson
*Assistant Examiner*—Stella Yi
(74) *Attorney, Agent, or Firm*—Novak Druce + Quigg LLP

(57) ABSTRACT

Process for continuous manufacture of latex foam rest articles such as mattresses, cushions and the like comprising a part able to participate to the manufacture steps and to remain embedded in the article with consequent improvements of final performances. A flexible perforated band, preferably a flat polymeric material net with longitudinal and cross reinforcement members, is placed over a foam laying surface provided with protuberances and in continuous advancement between a foam laying station and an unlimited length article extraction station. The latex foam passes through net holes forming an upper portion and a lower portion relative to said net. The net continuously opposes contraction forces and weight force exerted from upper portion on lower portion. The unlimited length article is subjected to successive cross cuts originating rest articles wherein a foam embedded net is arranged on ends of recesses originated by the protuberances.

23 Claims, 5 Drawing Sheets

PROCESS AND PLANT FOR CONTINUOUS MANUFACTURE OF LATEX FOAM ARTICLES

This application is claiming the priority of Italian Patent Application No. MI 2006 A 000936 filed on 11 May 2006.

The present invention refers to a process and plant for the continuous manufacture of latex foam rest articles such as mattresses cushions and the like, and more in particular the invention refers to a process and plant comprising a part useful both for said article manufacture steps control and to improve the features in the article wherein it remains embedded.

Latex foam articles are known manufactured using a single mould within which a latex foam mixture is subjected to various process steps.

A single mould generally comprises a hollow lower part and an upper part forming the cover, one or the other or even both provided with recesses formation protuberances.

As it is known, initially a latex and its components containing mixture are prepared.

Latex is an elastomer polymer dispersion in an aqueous serum.

Herein following the term "components" means all those substances, materials, ingredients and/or fillers whose presence is thought being useful to carry out optimally latex foam article manufacture steps with determined and desired characteristics.

Generally said "components" include surfactants, thickening agents, gelation agents, stabilizers, process accelerators, vulcanisation agents, fillers, and antioxidants.

The process employs a tank within which various components are added to a synthetic or natural rubber mixture.

The raw components prior to their addition to latex are transformed into an aqueous dispersion by grinders as to reduce particles sizes.

Herein following among most significant components surface active and gelation agents are recalled.

As it is known surfactants determine the presence around each single latex particle of a protective barrier opposing their approach; such barrier being formed by electric charges all of the same sign for all latex particles such that they repel each other avoiding a premature and undesired particle coagulation.

Gelation agents have the task of breaking the abovementioned barrier such that various latex particles, non longer subjected to repulsion forces may come near or away from one another being subjected to vibrations.

During such alternative motion latex particles touch and bond each other carrying out latex coagulation step.

Referring back to the mould manufacture process, to the latex and its components mixture in the container a pressurized gas is added and the mixture is agitated at high speed until its foaming is obtained.

A determined solution of a gelation agent destined to carry out the gelating step is added to the latex foam.

At this time, for a greater clarification in the present invention field of application we recall briefly herein that latex foam rest articles comprise characteristics and process steps different from other foam articles, for instance polyurethane foam.

As far as the process steps one should remember that latex article foaming is achieved inputting an external agent such as pressurized air in the mixture, while polyurethane mixture foaming is achieved by direct contact among polyoil and isocyanate, that is the same base materials making a polyurethane.

Further latex foam articles have a structure mainly provided with tiny open and uniformly distributed cells for all material thickness, polyurethane foam articles have mainly closed cells except specific polyurethanes wherein cells are blown up after specific treatments.

A latex foam article manufacture envisages filling up the mould with mixture comprising latex and components already subjected to foaming.

It is to be noted that after foaming the latex mixture is dimensionally unstable such that a risk exists of a cell walls collapse.

With the aim of facing such risk the gelating step is carried out.

Gelating may be defined as a homogeneous coagulation wherein part of the foam aqueous serum remains embedded in the rubber polymer. Chemically gelating is the transition from the "sol" phase to the "gel" phase. Gelating step avoids latex foam collapse after the laying.

The following vulcanisation step is carried out through a vulcanisation agent to determine the final article desired elasticity degree that is the elastic deformation, density and uniformity article characteristics that will assure comfort conditions for the user in a rest state.

During the vulcanisation step the mould is heated preferably with steam.

At the end of the vulcanisation step the mould upper part is rotated or it is lifted with respect to the hollow lower part to allow for article extraction.

As already mentioned latex foam mixture is an aqueous dispersion wherein a considerable amount of water embeds latex particles. For instance if the total amount of the latex foam mixture is 100 part in weight, the dry amount is 60 parts in weight and the water amount is 40 parts in weight.

In the various manufacture steps the water amount is diminishing due to phenomena relative to heat absorption by the latex foam.

In the gelation step, necessary to the latex foam dimensional stabilization, there occur reactions thereto takes part a temperature sensitive gelation agent in the sense that gelation time decreases with temperature increase.

Following gelation latex particles coagulate and free water.

In the vulcanisation step the vulcanisation agent under the temperature influence creates bridges between various latex macro-molecules forming said particles.

In practice there are formed chemical bonds destined to restrain macro-molecules unrestrained among themselves and consequently the volume reduces itself.

After in the drying step the amount of water is removed by evaporation providing heat to the latex foam by hot air circulation.

The various cited process steps determine material shrinkage phenomena with consequent reduction of final desired sizes.

Continuous latex foam rest articles manufacture processes are also known.

Such continuous processes are used and described in the assignee patents EP-B-0,380,963, U.S. Pat. Nos. 5,229,138, 6,086,802, EP-A-1,361,033.

Understandably continuous processes permit to achieve high productivity levels as compared to single mould processes.

Nevertheless continuous processes as single mould ones bring about the cited material shrinkage phenomena relative to the starting programmed amount.

Such material shrinkage is a few percent but brings about anyway a final product dimensional reduction as compared to the programmed.

In particular the material shrinkage is more evident in continuous processes where a latex foam block at the end of a daily manufacture cycle takes usually unlimited defined length values.

To clarify which is the material shrinkage phenomenon one thinks that a 4% shrinkage relative to a latex foam block of 1,000 meters would imply a shrinkage in the block length direction of 40 meters with consequent less production of 40 mattresses if each of them were assigned a 1 meter width.

Unfortunately a latex foam article manufacture is very complex because firstly it comprises a stable dispersion formation of rubber particles in an aqueous medium obtained controlling the chemical-physical properties of the interface between the aqueous phase and the latex particles, then the foam formation obtained supplying the gas necessary to realize the new dispersed phase and the surface energy necessary to form a gas-liquid interface, then the foamed latex gelation achieved destabilizing the rubber particles-water interface, with eventual bonding of latex particles and formation of a reticular structure that stiffens the latex foam.

The conditions in which such steps occur are obtained by specific process parameters such as time and temperature and appropriate component dosage, according to rules dictated more by experience than by a perfect knowledge of the phenomena involved.

Therefore trying to leave the normal and tested operational conditions to obviate to the prior cited material shrinkage phenomena may bring about a variation even negative of the final article performances.

It has then been thought that it was possible to find a solution to the cited problem using a process element able to act on the latex foam block on continuous manufacture without altering the operational parameters nor the foam composition and the steps sequence.

Nevertheless even this potential solution did not appear a workable one because the shrinkage phenomena occurred within the latex foam and the process element might not be extracted from the foam block without impairing the cellular structure.

It was then felt that a possible solution might be found using at least an element able to be active both in the process steps to control and anyway to counteract the article shrinkage phenomenon and in the final article to provide it with possibly improved performances.

It forms therefore a first aspect of the invention a process for continuous manufacture of an unlimited length latex foam block to be divided in a plurality of articles by cuts transversely to said unlimited length, comprising the steps of advancing along a predetermined longitudinal direction a laying surface provided with protuberances between a first and a second station, of laying in said first station a latex foam mixture on said deposit surface in continuous advancement, of gelating, of vulcanising, of drying characterized by the steps of:

a) providing, proximate to said first station, a substantially flat flexible band of unlimited length and provided with a plurality of through openings;

b) placing said flexible band on said laying surface protuberances;

c) advancing continuously said flexible band with said laying surface;

d) introducing said mixture in said band openings;

e) forming a latex foam layer comprising a lower portion and an upper portion respectively below and above said band;

f) pressing with said upper portion weight said band against said laying surface protuberances;

h) gelating, vulcanising, drying said foam block incorporating said band;

i) cutting said foam continuous block incorporating said band with consecutive cross cuts displaced one from the other a predetermined distance.

Preferably said band is from polymeric material.

In the following with the expression "substantially flat and flexible band provided with a plurality of through openings", is meant to indicate both a structure formed from a net comprising a plurality of longitudinal members cross oriented to each other to form meshes whose area corresponds to said openings either a flexible laminar structure provided with regular or irregular shape holes corresponding to said openings or anyway a flexible structure tape shaped or the like with openings through which a latex foam passes.

In the following with the expression "polymeric material" is meant to indicate a material generally adapted to said band construction, of natural or synthetic type, comprising longitudinal members, such as mono-filaments or braids or fibres for instance of aramide or in general plastic fibres distributed in an orderly way or in a loose way without preferential orientation for forming nevertheless among them said openings, and/or plates, and/or flexible straps in plastic material having openings distributed in orderly or even unorderly fashion.

By the term substantially flat is meant to indicate a band that might acquire a configuration little different from the flat one for instance slightly undulated.

Preferably said band consists of a propylene or polythene or polypropylene or polyamide plastic polymer.

Typically the band is a net or a plate, in single shape or in overlaid layers.

Conveniently the process is characterized by laying over said band a latex foam of density comprised between 40 to 270 grams/litre when such laying surface rate is comprised between 0.3 to 1.5 meters/minute.

Advantageously the process is characterized by laying over said protuberances a band resistant to compression forces acting following at least a first and a second direction perpendicular to each other in a same plane and following a third direction perpendicular to said plane, said at least first and second direction corresponding to the longitudinal and the cross direction of said latex foam block in continuous advancement.

Preferably the process is characterized by depositing a band wherein the reaction to said forces exerted on a foam block matches the dimensional reductions along said first and second direction up to 5% compression value. Conveniently a foam block sample provided with said band with width comprised between 180 cm to 220 cm, length comprised between 60 cm to 220 cm, thickness comprised between 10 cm to 240 cm, has a lift value comprised between 3% to 15% more as compared a same sample without band.

It constitutes a second aspect of the invention an unlimited length latex foam block continuous manufacture plant to be subdivided in a plurality of articles by cuts transversely to said unlimited length, said plant being formed by a structural part comprising a laying surface in continuous advancement along a predetermined direction between a first latex foam laying station and a second said block extraction station, a plurality of protuberances cantilevering from that laying surface to a plane parallel to said laying surface plane, a latex foam gelation device, a vulcanisation device before said second extraction station, a drying device, that plant being characterized by comprising an auxiliary part in continuous advancement able to take part to the operation step and to remain embedded in said article by a determined length after said block cutting, said auxiliary part comprising an unlimited length flat band and provided with a plurality of through openings, said band being placed continuously on said protuberances and associated to said protuberances by the latex foam passing through said openings.

In a third aspect the invention is relative to a latex foam block comprising a plurality of lower recesses extending up to a predetermined height "s1", characterized by chemically incorporating along the plane boarding the recesses ends a polymeric material flexible band provided with through openings.

Conveniently said band in a plastic material net provided with a plurality of meshes forming said openings.

Preferably the foam block comprises a plurality of openings ordered according two directions perpendicular to each other in a same plane, said openings having in a direction a pitch comprised between 1 cm to 4 cm, and in the other direction a pitch equal to that of the first direction or even different.

The present invention will be now further described with the aid of the accompanying figures, provided in a non-limiting illustrative way, wherein.

Figure 1:
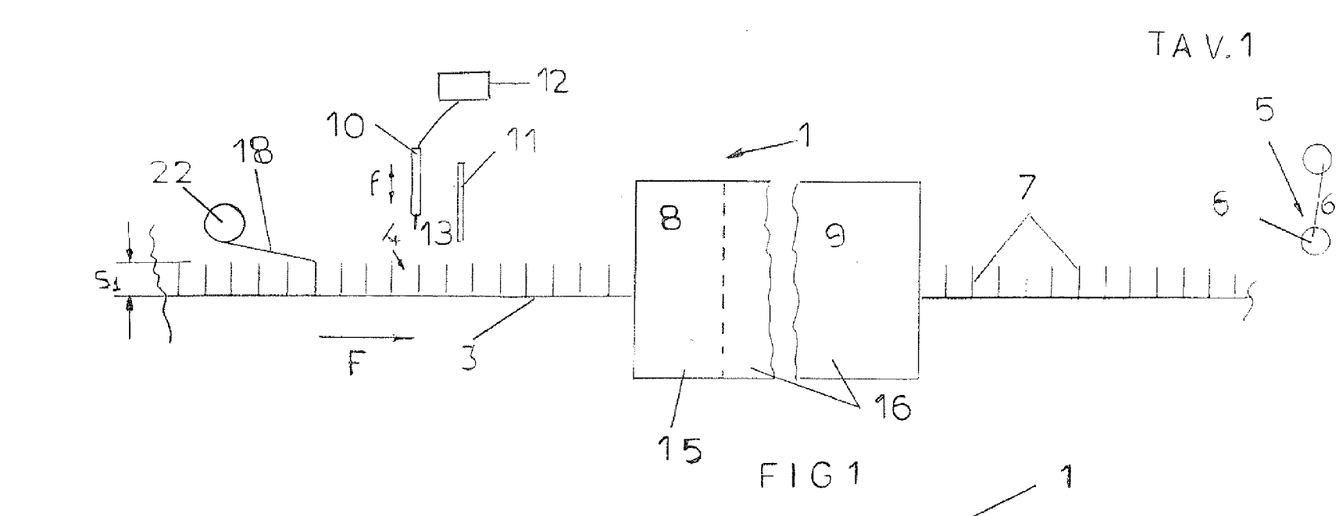
FIG. 1 is a longitudinal partial schematic view of the plant according to the invention.
Figure 2:
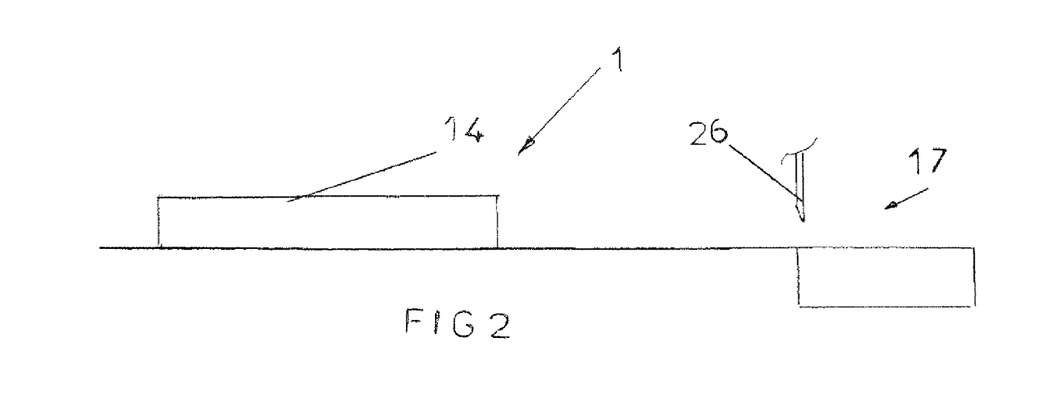
FIG. 2 is a longitudinal partial schematic view of the final part of FIG. 1 plant.
Figure 3:
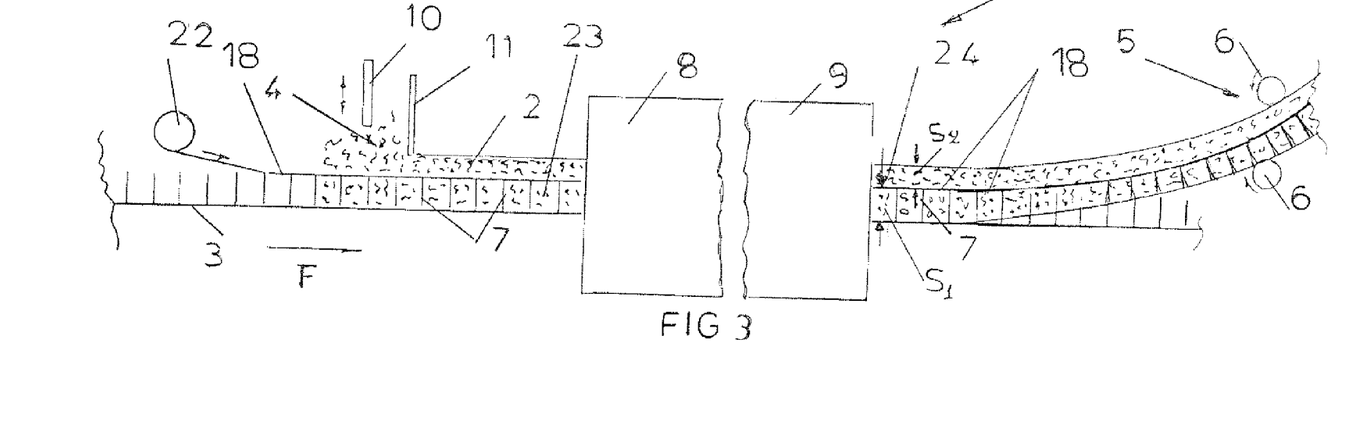
FIG. 3 is a longitudinal partial schematic view of the plant of FIG. 1 during a foam block production.

In FIGS. 1-3, 1 is a plant for the continuous manufacture of an unlimited length latex foam 2 to be subdivided in a plurality of rest articles such as for instance mattresses.

Plant 1 comprises structural parts and auxiliary parts.

In the following the expression "plant structural parts" means, as already known in traditional techniques, means, accessories and devices necessary for block manufacture and the expression "plant auxiliary parts" indicates, according to the present invention, means capable to influence advantageously both the block manufacture steps and the final articles performances.

Therefore said plant structural parts are absent in the final article while said plant auxiliary parts to achieve the invention aims are present both during the plant operation and in the final article.

Now the plant 1 structural parts are described.

Such plant 1 structural parts comprise a latex foam laying surface 3 in continuous advancement along a predetermined longitudinal direction "F" between first foam laying station 4 and an extraction station 5. A counter-rotating rollers pair 6 in extraction station 5 carries block 2 towards drying device and further possible plant devices and finally to a cutting station for the formation of an plurality of articles.

Laying surface 3 comprises a plurality of protuberances 7 cantilevering from the base to form, as it is known, a plurality of lower recesses in the foam block.

The protuberances ends lie along an imaginary plane at a determined height "s1" with respect to laying surface 3.

Plant 1 structural parts comprise gelation means 8 followed by vulcanisation means 9.

Both such means 8, 9 are placed between first and second station 4, 5. Gelation means in their most general embodiment must be able to stabilize the latex foam and to this purpose they use heat sources able to provide temperatures from 18° to 55° degrees centigrade, and more preferably from 27° to 49° C., in the environment crossed by the latex foam block.

Near first station 4 is placed a laying device 10 of a latex foam base mixture destined to form a block 2 base layer and at a short distance from first station is placed a foam levelling doctor blade 11.

Said laying device 10 is moved in a cross direction to surface 3 advancement direction and coming near or away from such surface 3 in arrows "f" direction by adequate slide guide and drive means not illustrated because of any known type.

Further laying device 10 is connected to a latex mixer.

Said mixer comprises multiple tanks and various equipment, among which the control, supply, send and connection ones.

For description shortage said mixer has been exemplified with a single tank 12 provided with appropriate connection piping to a mixture laying head 13.

Preferably gelation means 8 and vulcanisation means 9 comprise a single tunnel type device partitioned in a first and a second chamber 15, 16.

The tunnel is heated with 100° C. steam.

The plant final part comprises a drying device 14 and a cutting station 17 wherein a blade or similar means separate the continuously moved block portion from the block portion destined to form the single mattress (FIG. 2).

At the end of the plant structural part description now the plant 1 auxiliary parts are described that form the inventive solution of the present invention.

Said auxiliary parts consist in a flexible plastic band flat shaped provided with a plurality of through openings.

Said band, as explained later, is an active part in the manufacture process in conjunction with laying surface 3 protuberances 7.

In a description example said band is formed from a plastic net 18 comprising (FIG. 4) a plurality of longitudinal members 19 cross oriented one to another to form a plurality of meshes bounding through openings 20.

Figures 4, 8:
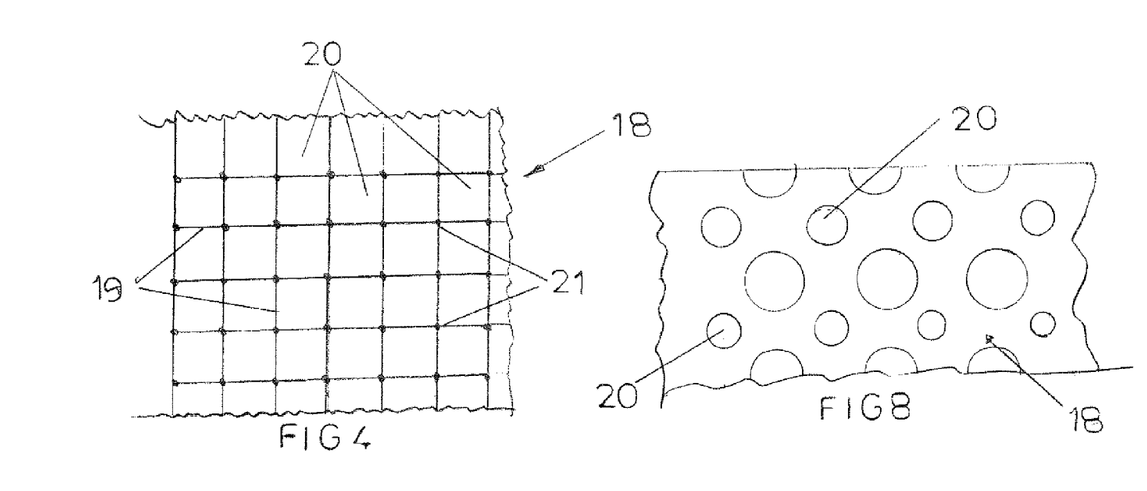
FIG. 4 is a plan view of an auxiliary part of FIG. 1 plant.
FIG. 8 is a plan view of a third embodiment of FIG. 1 plant auxiliary part.

In the description example plastic material net 18, such as high density polyethylene or propylene or polyamide or other equivalent materials, is obtained for example in some instances by extrusion and in others by heat-seal.

Said various longitudinal members 19 may be thermoplastic mono-filaments, placed according rows preferably but not necessarily perpendicular to each other in the same plane.

Such longitudinal members have a diameter comprised from 1 to 7 mm and are restrained solidly between themselves in their reciprocal meeting points wherein they form nodes 21.

Net 18 presents meshes preferably square shaped, nevertheless according to what will be explained later such meshes might take up a different geometrical configuration.

Net 18 comprises said plurality of square shaped meshes whose area is identified from one side by dimensions comprised from 10 to 40 mm.

Now plant 1 operation is described.

Plant 1 operation for an unlimited length foam block 2 manufacture initially comprises the step of sending net 18 towards laying surface 3 already in continuous advancement in F direction towards extraction station 5.

Before this step net 18 has been preset on already known appropriate accumulation and feeding means, for instance of the type comprising a plurality of return pulleys set in such a way as to guide the net according to an undulated path formed by multiple loops with a fly-wheel function.

In a particular embodiment visible in FIG. 1 said accumulation and feeding means are schematised with single collection coil 22 on which cylindrical surface is wound a plurality of net concentric loops.

The various loops are unwound and guided, manually or through motorization, towards plant 1.

Conveniently net 1 has bending characteristics to wind itself up according concentric loops on the cylindrical surfaces of one or more coils with diameters comprised from 5 cm to 100 cm.

Net 18 head is connected to some laying surface 3 protuberances 7 top.

Net 18 dragging by laying surface 3 advancement brings the net in first station 4 zone wherein laying device 10 is activated.

In first station 4 laying head 13 moved in a direction and in the oppose one across to the laying surface 3 advancement direction sends latex foam downward forcing it to pass through net openings 20.

Now latex foam propagates between laying surface 3 protuberances 7 and over net 18.

It is highlighted that net 18 is now already stably anchored to latex foam.

The net bounds two foam portions in the following called lower portion 23 with a thickness s1 and upper portion 24 with a thickness s2 (FIG. 3). Foam block 2 proceeds its path in longitudinal direction "F" and in passing under doctor blade 11 is levelled acquiring on the outside a substantially flat shape.

The foam blocks manufactured with the process being described have a thickness s1 in lower portion 23 comprised from 9 cm to 15 cm, and a thickness s2 in upper portion 24 comprised between 9 to 15 cm.

Then block 2 always associated to laying surface 3 reaches and passes through gelation 8 and vulcanisation 9 device receiving the heat necessary with respect to its dimensional stabilization and its chemical reticulation.

Foam block 2 along the whole path from laying station 4 to vulcanisation device and thereafter to drying device 14 is subjected to contraction forces and thereafter to the weight force exerted by upper portion 24 towards lower portion 23.

In the state of the art relative to traditional plants, said forces effect is not counteracted, therefore the foamed material reduces itself with respect to the desired dimensions.

Advantageously net 18 forms that plant 1 auxiliary part able to limit if not to completely cancel the cited forces effect.

Net 18 is pressed towards the plurality of protuberances 7.

Due to the effect of upper foam weight 24 all crossing nodes of net 18 longitudinal members 19 are blocked, therefore any relative motion among various nodes is prevented.

Figure 5:
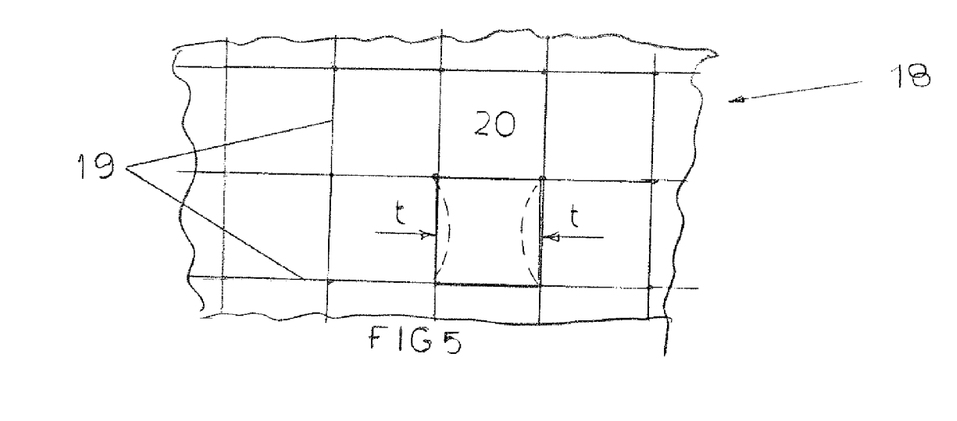
FIG. 5 is a schematic plan view of some forces acting on the auxiliary part of the plant shown in FIG. 4.

Referring now to net 18 schematically represented in FIG. 5 plain view it is highlighted that latex foam possible contractions indicated with opposite arrows in a determined direction and with t letter unload themselves upon longitudinal members 19, but due to the fact nodes 21 remain in an unchanged position, contraction forces effect "t" might not be able to do nothing but bend longitudinal member 19.

Nevertheless the conveniently adapted mechanical characteristics for the net are such as to substantially limit the deformation values, counteracting in such manner the effects otherwise following the contractions presence.

The previous consideration has been made relative to the horizontal contraction forces present in one block 2 plane but because various upper portion 24 planes are bound to one another by the same cellular structure, one has the effect that all planes contractions transfer itself to the plane provided with more resistance and that is the nearest to net 18.

Further the previous considerations referred to horizontal contractions may be referred in the same manner to upper portion 24 weight effects with respect to lower portion 23.

In particular as may be noted in FIG. 3, upper portion 24 weight unload itself on the various sections of longitudinal member lying on the ends of a protuberances pair 7 proximate to each other; each said portion behaves like a civil construction beam which uniformly loaded for all its length, unload the weight loaded on it to the extreme abutments realized with high mechanical strength.

Figure 6:
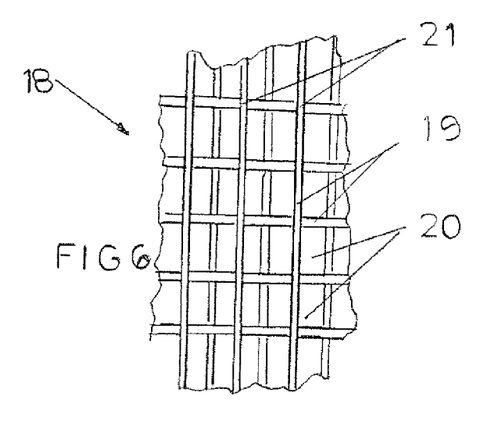
FIG. 6 is a plan view of a second embodiment of FIG. 1 plant auxiliary part.

The previous description was made relative to a net wherein various longitudinal members 19 are cross-oriented to each other and restrained to nodes 21, nevertheless are within the scope of the invention plastic nets whose various longitudinal members are not rigidly restrained to each other in the cross points such as illustrated by way of example in FIG. 6 or also for instance when the net takes up a configuration similar to a non woven fabric and anyway be provided with openings able to be crossed by a latex foam. Referring to FIG. 6 net it is to be observed that longitudinal members 19 meet in the plurality of points 21 subjected to compression forces due to foam upper portion 24 weight.

Thus such points 21 stay in an unvaried position to each other allowing net 18 to abide to its plant auxiliary part previously explained function.

Further a major part of upper portion weight 24 unloads itself on the wide surface distribution of resisting members in the net reducing in this manner the compression effect on lower portion 23, therefore stabilizing said lower portion density as desired.

Taking back up the plant operation it is to be noted that foam block 2 incorporating net 18 advances in predetermined longitudinal direction "F" remaining associated to laying surface 3 until when in the passage through 6 rollers pair is detached from said laying surface and pushed continuously towards drying device 14 and then towards cutting station 17.

In cutting station 17 (FIG. 2) foam block 2 advances underneath an appropriate cutting blade 26 for a section corresponding to a desired width dimension of a single mattress.

Figure 7:
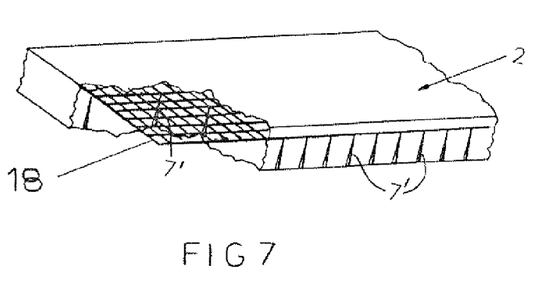
FIG. 7 is a perspective partial view of the latex foam block shown by FIG. 1 plant 1.

After such section measurement, carried out by various optical and/or mechanical devices known by themselves, blade 26 is lowered until it separates the single mattress for cross cutting (FIG. 7) from foam block 2 always in continuous advancement.

It is to be noted that net 18 from the vulcaniser exit to cutting station 17 goes on carrying out its plant auxiliary part function and after cutting, net portion 18 incorporated in single mattress body contributes with its characteristics to improving the elastic strength of the foam whole cellular structure wherein it is embedded.

Up to this point the description has been made relative to a plant 1 comprising a laying surface 3 schematically indicated with a straight line.

Such laying surface 3 might take up various embodiments and among these is mentioned that described in patent EP 0,358,914 herein incorporated in case a detailed explanation of its operation might be necessary.

In the following it is briefly indicated that laying surface 3 belongs to a motion transmission made up by a plurality of lower plates side by side to each other and cross-anchored to two chains (not shown) arranged in an annular configuration around two pulleys, one of which a drive one.

Such plates, preferably in aluminium, comprise protuberances 7, preferably hollow, useful both for lower recesses moulding 7' (FIG. 7) in the base layer and to gelate and vulcanise in a diffused manner the latex foam mass.

To understand even better the core of the invention is underlined that plant 1 description has been made referring to a flexible plastic band with a net shape, nevertheless said band might take up different configurations.

To that end in FIG. 8 it has been indicated with the same reference numerals of previous figures a further perforated band, made up from plastic material and with a configuration corresponding to a flexible laminar structure 18 provided with through holes 20.

Said through holes might be of circular shape, non necessarily of equal diameter, or of square or rectangular shape, or realized according to other geometrical shapes such as for instance hexagonal, octagonal or egg-shaped as both with an equal geometry with each other and with a different geometry in one and the same laminar structure.

Advantageously the laminar shape of flexible band 18 allows to distribute over a wide continuous surface the weight force exerted from upper portion 24 towards lower portion 23, accordingly the pressures exerted on said lower portion are reduced leaving substantially unvaried the density with respect to the programmed one at the start.

In all the chosen solutions of the present invention the materials forming the flexible band must be such as to keep substantially unaltered their mechanical strength physical characteristics throughout all foam block 2 manufacture steps.

In particular the band must be able to withstand, without loosing its starting characteristics, at high temperatures both in the vulcanisation step carried out in the presence of 100° C. steam and in the dying step carried out with hot air temperature higher than 100° C.

It is to be underlined at this point as a further characteristic of the invention the function that might be carried out by openings 20 of perforated flexible band 18 to control foam density and viscosity.

Relative to the advancement rate of laying surface 3, openings 20 size is selected at a start such as to allow a latex foam easy passage thorough band 18.

If after in the manufacture process there might be noticed foam stagnations and/or poor foam filling between protuberances 7, it will be possible to check if the mistake is to be charged to a variation of foam density or viscosity and correct its value, for instance adjusting again changing during the foaming step the pressurized air to the latex amount ratio.

It was found convenient to adopt a density of the foam inputted by deposition head 13 comprised from 10 to 270 grams/litre when the laying 3 surface rate is comprised from 0.3 to 1.5 meters/minute.

In particular it has been found convenient to adopt a perforated band (FIG. 8) with a laminar shape wherein the total voids area is considerably greater then full area and preferably a band with a voids to full ratio from 5 to 2 in combination with foam density and advancement values just cited.

It is to be underlined that flexible bands 18 may have openings 20 distributed unevenly or even according to orderly rows.

Referring to flexible bands 18 with openings 20 distributed evenly in the following are defined some geometrical characteristics of said openings 20 that allow to obtain an even latex foam distribution when arranged in combination both with protuberances 7, and with the foam density and the surface 3 advancement rate having previously cited values.

It has been found convenient to adopt flexible bands comprising openings 20 oriented according orderly rows in two major directions perpendicular to each other such as represented in FIGS. 4-6.

Preferably said band openings 20 have a minimum dimension, in any direction, at least greater than 8 mm and extend themselves in a first longitudinal dimension with a pitch from 1 cm to 4 cm and in a second direction perpendicular to the first one with equal pitch values.

Laying 3 surface protuberances 7 have a circular base with a diameter from 2 to 24 mm and a cross dimension of the upper end from 1 to 18 mm.

Further laying 3 surface comprises a number of protuberances 7 from 6 to 84 protuberances/square decimetre.

Figures 9, 12:
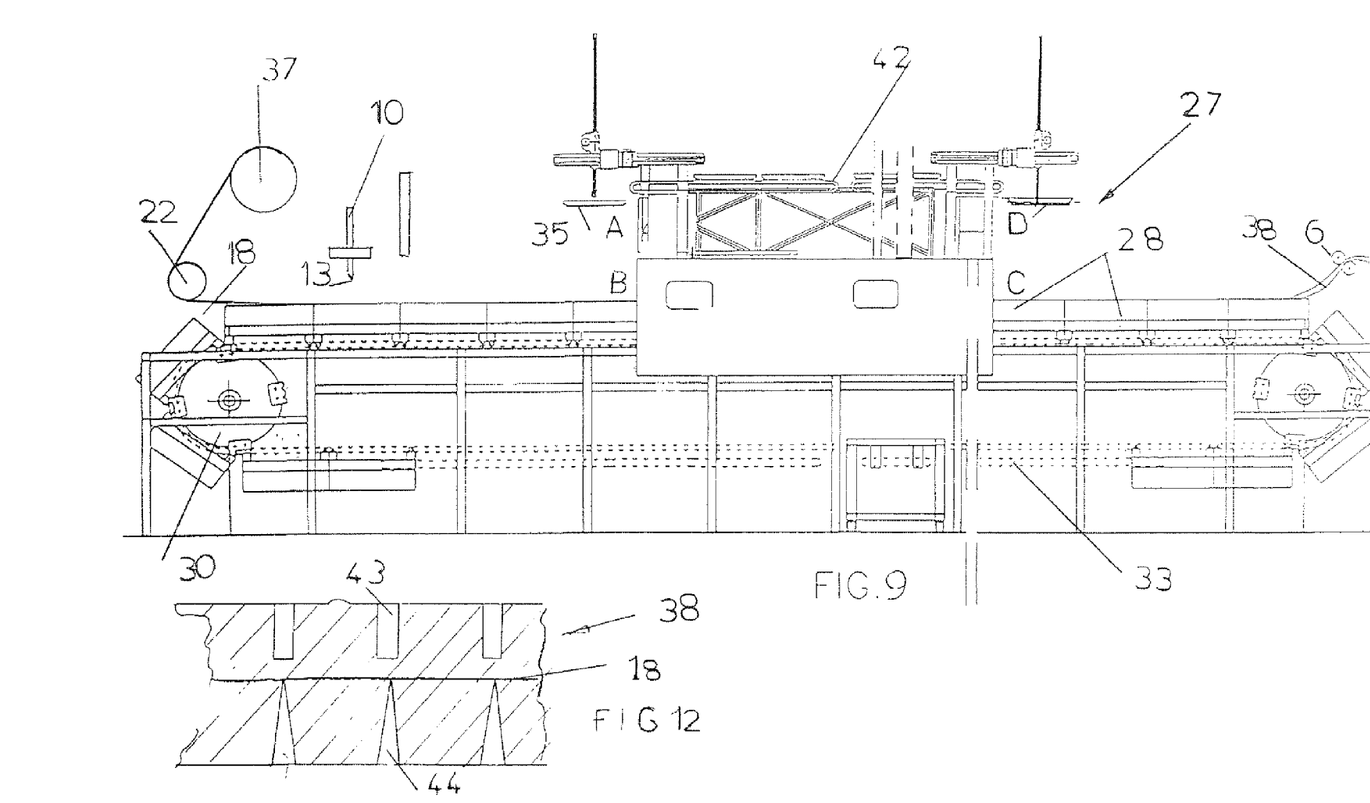
FIG. 9 is a longitudinal view of a further embodiment of the latex foam continuous block manufacture plant.
FIG. 12 is a longitudinal section of a mattress manufactured by FIG. 9 plant.

Now in FIG. 9 is described a preferred embodiment of a plant 27 for a latex foam block 2 continuous manufacture comprising both upper recesses and lower recesses.

Plant 27 similar to that described for plant 1 of FIG. 1, is made up by structural parts and by auxiliary parts.

The plant structural parts correspond substantially to what already described in patent EP-A-1,361,033 herein incorporated for any further possible clarification.

In the following are briefly cited the structural parts necessary to the understanding of their operation.

Said structural parts comprise a laying surface made up by a plurality of trucks 28 with protuberances 29 (FIG. 10) moved along an annular circuit comprising two teethed pulleys one of which a drive one 30, the other a tail one.

Figure 10:
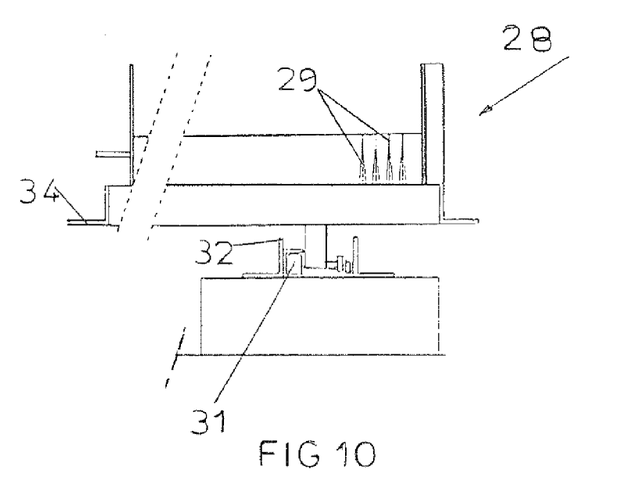
FIG. 10 shows a detail of FIG. 9 plant.

The trucks are provided at the lower surface ends with pairs of rollers geared with the two pulleys grip means and are pushed by drive wheel 30 in contact to each other along the active upper branch wherein they receive the latex foam through deposition head 13.

The trucks displacement is guided in the upper branch through the sliding of wheels 31 along appropriate guides 32 of a fixed structure.

Lower branch trucks may be in number lower as compared to the upper branch ones and in this solution they are moved through displacement means, such as conveyors 33 and the like, in an way independent from the drive pulley drives, at a rate higher than the upper branch one.

In the tail branch the trucks rest with side flanges 34 on conveyors 33.

Plant 27 upper part comprises a plurality of plates 35 (FIG. 9, 11) each of which is provided with a plurality of protuberances 36 adapted to form upper recesses on the foam block.

Now the auxiliary parts of plant 27 are described.

Said auxiliary parts the same as described in FIG. 1 comprise plastic net 18 with holes 20 illustrated in FIG. 2.

Net 18 is wound around a collection coil 37 to later pass around coil 22 and there from towards the trucks protuberances.

Plant 27 lower part operation is substantially analogous to that of FIG. 1, therefore in the following is omitted, for the sake of simplicity, the description relative to plastic net 18 deposition and embeddement in the foam as well as the function realized by the net as an auxiliary part of plant 27.

It will be simply said that a latex foam body 38 (FIG. 12) wherein a plastic net 18 is embedded in contact with the upper ends of protuberances 29 advances solidly with trucks 28 towards the gelation and vulcanisation device.

The body 38 whole thickness may be from 10 to 30 cm.

Plates 35 are moved along the annular circuit indicated with ABCD.

In the AB portion plates 35 are lowered on the foam body, in the BC portion the plates rest at their ends to the side walls (not illustrated) of the trucks and protuberances 36 are embedded in the foam body.

In the CD portion plates 35 are extracted and lifted one at the time relative to the foam body and in portion DA the plates go through the return branch.

Figure 11:
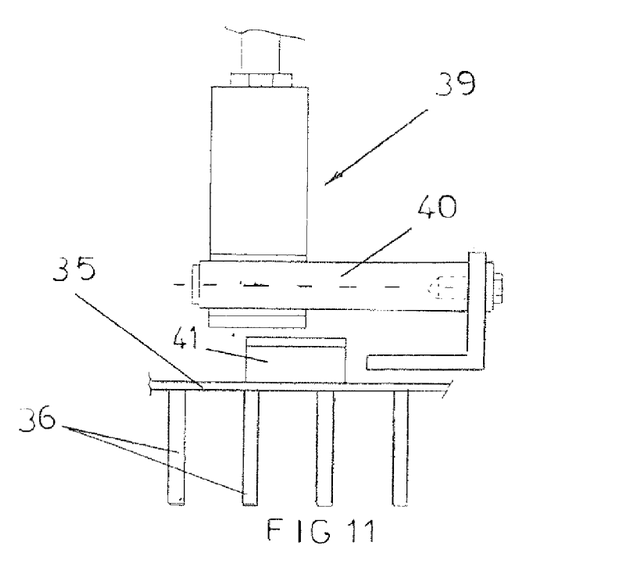
FIG. 11 shows a further detail of FIG. 9 plant.

Plant 27 comprises plates 35 lifting and lowering means, realized by pneumatic drives 39 of vertical and horizontal displacement, the latter displacement being realized through a member 40 adapted to grip in an opening 41 of each plate 35 (FIG. 11).

Said displacement means act in sections AB, CD.

Plates 35 displacement in upper branch DA is realized through conveyors 42.

Advantageously upper plates 35 and relative protuberances 36, preferably in aluminium, come to the tunnel entry already pre-heated by the previous passage thorough active section BC.

In plant 27 following sections foam block 38 advances continuously associated to the trucks until the extraction station where it passes through rollers 6 detaching itself from the trucks.

The successive steps comprise the block pushing towards the drying and cutting device such as explained referring to FIGS. 1-3.

Foam block 38 after the cut (FIG. 12) comprises upper recesses 43 and lower recesses 44. Recesses 44 upper ends are bounded by net 18.

Plants comprising previously described structural parts and auxiliary parts allow to reach the predefined aims as highlighted from the following test.

A first and a second latex foam mixtures have been prepared, both of the same composition and preparation.

The material quantity employed has been determined with the aim to continuously manufacture two foam blocks each of 100 meters length, 200 cm width, total thickness "S" of 18 cm.

The first mixture has been used to continuously manufacture a first block without a flexible perforated band, the other to manufacture a second block incorporating a flexible perforated band with the characteristics described in relation to FIG. 4 example.

The latex foam formulation was as follows:

| Materials | % parts in weight for 100 parts of dry polymer |
| --- | --- |
| Natural rubber latex | — |
| Synthetic rubber latex | 100 |
| Potassium resinate | 1 |
| Antioxidants | 0.8 |
| Zinc oxide | 2 |
| Sulphur | 2.5 |
| Accelerators | 2 |
| Byphenil-gualidyne | 1 |
| Gelation agent: SSF | 3 |

Both mixtures have been used with FIG. 9 plant 27, nevertheless the first mixture has been used with plant 27 comprising only the structural parts and the second mixture with plant 27 comprising also the auxiliary parts.

The test results have highlighted the dimensional values shown in the following table relative to without band block 1 and with the band block 2:

| Dimensions | Programmed | Block 1 | Block 2 |
| --- | --- | --- | --- |
| Length (mt) | 100 | 97 | 99 |
| Width (cm) | 200 | 198 | 199 |
| Thickness (cm) | 18.5 | 18.4 | 18.4 |
| % length shrinkage | 0 | 3 | 1 |
| % width shrinkage | 0 | 1 | 0.5 |
| % thickness shrinkage | 0 | 0.5 | 0.5 |

Advantageously the table results show a significant block 2 material shrinkage reduction with respect to block 1 referring to the length and width desired values.

As far as the thickness values are concerned one may have block 2 thickness reductions moderately greater to block 1 thickness reduction, nevertheless it is possible to compensate easily this thickness reduction adding a small quantity of latex foam material to the starting formulation.

But what has to be highlighted is that thanks to the net presence in block 2 it is possible to significantly reduce block 2 density with respect to block 1 keeping the same the two blocks carrying capacity.

If it is now considered an algebraic sum whose factors are the cited modest latex foam addition for the possible moderate reduction of the thickness of the block 2 with respect to block 1, one can readily see that the algebraic sum economic value is considerably advantageous for block 2 as compared to block 1.

In fact, as is obviously understandable, to the cited block 2 density reduction at equal carrying capacity with block 1 would correspond a high material reduction that may be estimated equal to 10% in percent value maintaining a carrying capacity value in both blocks substantially equal such as for instance 170 Newtons.

Now the advantages derived from the article illustrated in FIG. 12 are highlighted be it a mattress or a pillow or a part thereof.

The main characteristic of such latex foam is in the combination of a plurality of determined height recesses and of a perforated net placed on the plane where the recesses upper ends are.

The formation of a plurality of recesses obtained, whatever the article manufacture process might have been, has guaranteed in the vulcanisation step through a corresponding protuberances presence an uniform heat transmission through said protuberances with consequent capillary and uniform crosslinking.

The recesses presence in the article then guarantees both an improved air passage in combination with the channels created by the latex foam cellular structure itself and a uniform elastic deformability with consequent advantage for the user rest.

The perforated net presence then entails a uniform increased lift of the article at equal foam density.

In fact in this article it is noted that the net, blocked during the manufacture process, whatever it may be, over the protuberances due to an upper latex foam portion weight effect, determines the formation of a plurality of latex foam annular configurations concentrically interlinked with innumerable hole pairs of the net.

As may be understood such linkage forces the net to lye over the recesses upper ends plane.

Thus if various consecutive cross sections upon the article are considered the article carrying capacity is equal in all such various sections differently from what might happen if the net were placed not aligned relative to the recesses ends, for instance at first aligned and then with a loop that brings the net to a different height relative to the recesses upper ends.

The invention claimed is:

1. Process for the continuous manufacture of an unlimited length latex foam block to be subdivided in a plurality of mattresses by cuts transversely to said unlimited length, comprising the steps of:

advancing along a predetermined longitudinal direction a laying surface provided with protuberances, having tapered ends to form recesses in said mattresses, said laying surface advancing between a first and a second station, laying in said first station a latex foam mixture on said laying surface in continuous advancement, and further comprising:

a) providing proximate to said first station a substantially flat flexible band of unlimited length and provided with a plurality of through openings;

b) laying said flexible band on said laying surface protuberances;

c) advancing continuously said flexible band with that laying surface;

d) introducing said mixture in said band openings, downwardly passing a portion of the mixture through the openings;

e) forming from the mixture a continuous latex foam layer comprising a lower portion and an upper portion respectively below and above said band, the latex foam mainly comprising open cells;

f) pressing with said upper portion weight said band against said laying surface protuberances;

g) gelating, vulcanising, drying said foam layer incorporating said band to form said foam block of continuous latex foam incorporating said band;

h) cutting said foam block of continuous latex foam incorporating said band with consecutive cross cuts at a predetermined distance from each other.

2. Process according to claim 1, comprising laying on said protuberances said flexible band made with polymeric material.

3. Process according to claim 1, comprising laying over said protuberances said flexible band made with plastic material.

4. Process according to claim 1, comprising preparing and laying on said band a latex foam mixture with a density from 40 to 270 grams/liter.

5. Process according to claim 1, wherein the number of said protuberances is from 6 to 84 protuberances/square decimeter.

6. Process according to claim 1, comprising laying over said protuberances a flexible band wherein the ratio between the voids and the full area is from 5 to 2.

7. Process according to claim 1, wherein said plurality of protuberances cantilevering from said laying surface to a plane parallel to said laying surface.

8. Process according to claim 1, wherein said protuberances have a 2 to 24 mm lower diameter and a 1 to 18 mm upper diameter.

9. Process according to claim 1, wherein said band embedded in said continuously advancing foam forms means contrasting the contraction forces present on said block.

10. Process according to claim 1, wherein said band has a laminar structure provided with holes.

11. Process according to claim 1, wherein said band is made up from a plastic net comprising a plurality of longitudinal members directed transversely to each other to form a plurality of meshes.

12. Process according to claim 1, comprising feeding the belt from a coil with a collection seat of said band loops having a cylindrical surface with diameter from 5 to 100 cm.

13. Process according to claim 1, the latex foam block comprising a plurality of lower recesses extending up to a predetermined height "s1", incorporating along the plane delimiting the recesses upper ends a polymeric material flexible band provided with through openings.

14. Process according to claim 1, wherein said band comprises a plurality of through openings arranged according to two directions perpendicular to each other in a same plane, said openings having a pitch from 1 to 4 cm.

15. Process according to claim 1, wherein said band incorporated in said foam block consists of a plurality of longitudinal elements, wherein each longitudinal element is attached to other longitudinal elements of said plurality along points to form nodes.

16. Process according to claim 15, comprising upper foam portions weights unloading itself on the various sections of said longitudinal members lying on the ends of protuberances pair proximate to each other, reducing in this manner the compression effect on lower foam portions.

17. Process according to claim 15, wherein the latex foam block is subjected to contraction forces, said contraction forces unloading themselves upon said longitudinal members, so that the effect of said contraction forces is that of bending said longitudinal members limiting deformations values.

18. Process according to claim 1, wherein said band incorporated in said foam block comprises:

a first plurality of longitudinal elements oriented in said predetermined longitudinal direction, and a second plurality of longitudinal elements oriented transverse to said predetermined longitudinal direction, wherein each longitudinal element of said first plurality is attached to longitudinal elements of said second plurality along points to form nodes.

19. Process according to claim 1, comprising a first latex foam block of determined first density embedding the flexible band wherein the determined first density is reduced with respect to that of a second latex foam body without the flexible band having the same characteristic and carrying capacity of the first latex foam layer.

20. Process according to claim 1, comprising the step of cutting said foam continuous block incorporating said band, said foam block having a lift value between 3% to 15% more as compared to a same foam block without the band.

21. Process according to claim 1, comprising the step of laying said flexible band on said laying surface protuberances and of cutting consecutive cross-sections of said continuous foam block, all said sections having the same carrying capacity.

22. Process according to claim 1, comprising the step of laying said flexible band having a substantially flat configuration.

23. Process according to claim 1, comprising the step of laying said flexible band having a undulated configuration.

* * * * *